United States Patent [19]

Schewitz

[11] Patent Number: 4,836,936
[45] Date of Patent: Jun. 6, 1989

[54] BATCH FILTERING METHOD

[75] Inventor: Alexander Schewitz, East London, South Africa

[73] Assignee: Al Exfiltra Company (Proprietary) Limited, South Africa

[21] Appl. No.: 35,924

[22] Filed: Apr. 8, 1987

Related U.S. Application Data

[63] Continuation-in-part of Ser. No. 856,373, Apr. 28, 1986, abandoned.

[30] Foreign Application Priority Data

Feb. 21, 1986 [ZA] South Africa .................. 86/0724

[51] Int. Cl.⁴ .................. B01D 29/32; B01D 29/38
[52] U.S. Cl. .................. 210/791; 210/777; 210/323.2; 210/333.1
[58] Field of Search .................. 210/791, 333.1, 333.01, 210/411, 412, 777, 778, 193, 323.2

[56] References Cited

U.S. PATENT DOCUMENTS

| | | | |
|---|---|---|---|
| 2,570,132 | 10/1951 | Koupal | 210/411 |
| 2,784,846 | 3/1957 | Olson et al. | 210/333.01 |
| 2,981,416 | 4/1961 | Lawlor | 210/411 |
| 3,244,286 | 4/1966 | Schmidt, Jr. et al. | 210/333.01 |
| 3,414,129 | 12/1968 | Going et al. | 210/411 |
| 4,405,466 | 9/1983 | Giannelli et al. | 210/411 |
| 4,500,435 | 2/1985 | Muller | 210/333.01 |

Primary Examiner—Benoit Castel
Attorney, Agent, or Firm—Bacon & Thomas

[57] ABSTRACT

This invention relates to a method of batch filtration using a filter aid such as diatomaceous earth for example. The invention is characterized in that the filtration cycle of the filter includes a pulsed reversed flow stage in which fluid is pumped into the filter outlet with all the filter inlets closed. The filter drain is opened for a short time during the pulse. Loosening, breaking up and mixing of the filter cake and layer of filter aid is thus effected thereby extending time between cleaning or backwash stages when the filter aid is replaced. The life of each batch of costly filter aid is thus extended.

3 Claims, 2 Drawing Sheets

BATCH FILTERING METHOD

RELATED APPLICATION

This application is a continuation-in-part application to U.S. patent application Ser. No. 856,373 filed on Apr. 28, 1986, now abandoned.

FIELD OF THE INVENTION

This invention relates to a method of batch filtration and control means to effect that method of filtration.

BACKGROUND TO THE INVENTION

It is known in the art to overcome the problems of slow filtration rate, rapid medium binding and low filtration efficiency by means of filtration aids. Filtration aids generally comprise granular or fibrous materials, for example diatomaceous earth, which are capable of forming highly permeable filter cakes upon which filtration takes place.

Such filtration aids are generally only used in batch filtration processes wherein filtered matter progressively builds up in cake form until an unacceptably high pressure drop develops over the cake. The filtration process must then be interrupted in order to remove the cake either by backwashing or opening of the filter followed by physical removal of the cake. The filtration aid, almost invariably, cannot be separated from the filtered matter and is lost resulting in high operating expenditure. One commonly used filter aid is diatomaceous earth which is the skeletal remains of aquatic plants originating in prehistoric times and which is very costly.

It will be understood by those skilled in the art that the terms "cake" or "filter cake" imply a packed layer of filtered matter or contaminants which is produced adjacent the filter medium of a filter, by the progressive deposition of the filtered matter thereon. It will further be understood by those skilled in the art that the term "filtration cycle" implies the filtration process from one shutdown to the next and may include the steps of precoating a substrata with filter aid, filtering and backwashing or cleaning to remove both filter aid and filtered solids from the filter.

It has been suggested that, in order to prolong the filtration cycle between successive backwashings, filter aid be added in small amounts during filtration. This, however, increases the consumption of filter aid in any event It is accordingly an object of this invention to provide a method of batch filtration and control means to effect the method of filtration which at least increases the period of filtration between successive backwashings by increasing the amount of solids that can be filtered out using a predetermined amount of filter aid, thereby decreasing operating costs.

SUMMARY OF THE INVENTION

According to this invention, there is provided a method of batch filtration wherein liquid is passed through a layer of filter aid supported on a substrata therefor in a filter and a filter cake is built up on the filter aid and wherein cleaning of the filter is carried out periodically by backwashing the filter cake and filter aid out of the filter followed by the introduction of clean filter aid into the filter, the method being characterised in that a filtration cycle between successive backwashings includes a reversed pulse of fluid flow into a fluid flow outlet from the filter with all fluid inlets to the filter being closed to effect a temporary loosening and breaking up of both the layer of filter aid and the filter cake to thereby cause such filter aid and filter cake to become at least partially admixed and wherein filtration is carried out both before and after such reversed pulse of fluid flow.

Further according to the invention, the reversed pulse of fluid flow may have a duration of less than or equal to about 10 seconds during which time a drain of the filter may be opened for less than or equal to about 2 seconds.

Further according to the invention, the filtration cycle of the filter may include a series of successive filtering and reversed pulses of fluid flow.

Preferably, the substrata is fabric bags, sleeves or the like which will billow outwardly when receiving the reversed pulse of fluid flow thereby mechanically inducing or assisting the breaking up of the layer of filter aid and the filter cake.

The invention also provides control means to effect the above defined method of filtration and comprising a timing means having an output to a controller, the controller having an output to a filter pump; at least n electrically driven filter inlet valve, outlet valve and drain valve wherein the timing means activates the controller which activates at least one of the pump, filter inlet valve, outlet valve and drain valve selectively to provide the above defined filtration cycle.

The filter inlet and outlet may be connected by a pipe having an electrically operated valve therein and wherein the valve is activated by the controller.

The timing means may comprise two timers, a first timer arranged to time the overall filtration cycle and a second timer, activated by the first timer, arranged to time the periodic reversed pulsed fluid flow stages. Each timer may comprise a standard timer switch to activate the controller by either mechanical or electrical means.

The controller may be an analog or digital controller.

The controller may activate the filter pump and valves by electrical signals.

Other features of the control means provide for the controller to include a manual override; and for the manual override to include means to effect any one of the filtration stage, backwash or cleaning stage, pulse reversed flow stage or shutdown stage of the filtration cycle.

Embodiments of the invention are now described, by way of example only, with reference to the accompanying drawings.

DETAILED DESCRIPTION WITH REFERENCE TO THE DRAWINGS

Figure 1:
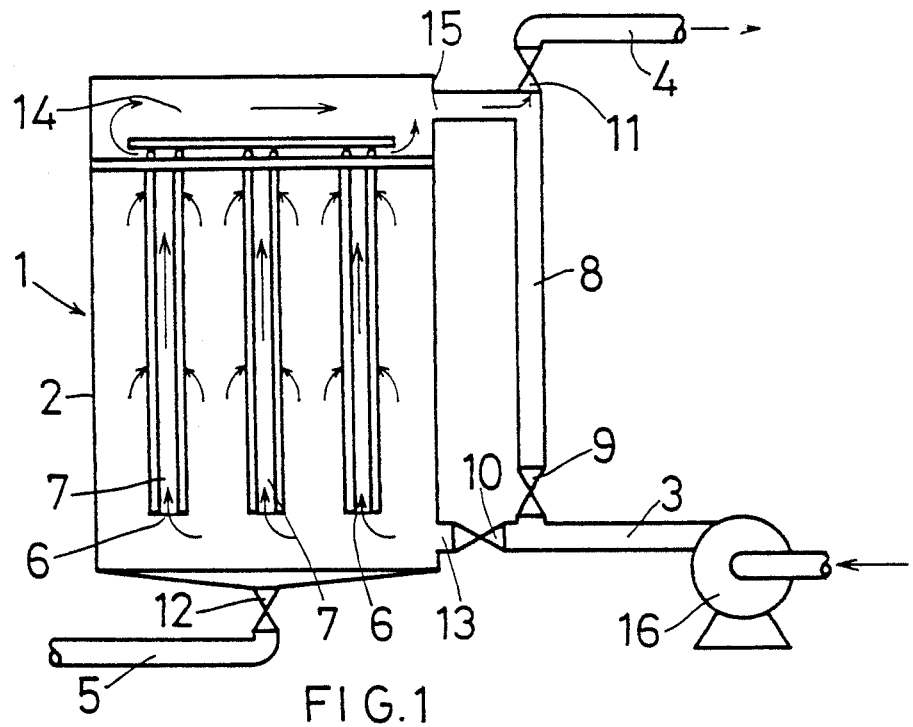
FIG. 1 illustrates a pressure filter in a filtration stage.

Referring now to FIG. 1, there is illustrated a pressure filter 1 of the a type known in the art. The filter comprises a pressure vessel 2 having an inlet pipe 3, an outlet pipe 4 and a drain pipe 5. The filter medium comprises vertical leaves each comprising a bag or sleeve 6 supported on a frame or hollow core 7. The inlet pipe and outlet pipe are connected by a pipe 8 having a valve 9 located therein. The inlet, outlet and drain pipes each have located therein a valve indicated by the numerals 10, 11 and 12 respectively.

In use, the inlet valve 10 and the outlet valve 11 are in an open position while the drain valve 12 and the connecting valve 9 are in a closed position. A slurry of a fluid and a filtration aid is initially pumped into the filter in order to provide a layer of filter aid on the filter bags or sleeves. This filter aid is preferably diatomaceous earth and the layer is preferably of the order of 0.2 to 0.3 inches thick. This is followed by the fluid carrying contaminants to be filtered out.

It will be appreciated that the fluid enters the pressure vessel via the inlet 13 which, in this type of filter, is generally located adjacent the vessel bottom. The pressurised fluid then passes through the layer of filter aid into the cores 7 leaving the filtered matter in cake form on the exterior of the filter aid. The fluid then passes up the cores 7 and is channeled via a manifold 14 to an outlet 15. This filtration stage continues until the build up of filtered matter on the filter is such that the pump 16 can no longer promote a sufficient flow of fluid or, alternatively, until a pre-set time period has elapsed. It will be understood by those skilled in the art that the pump 16 will generally be a centrifugal type pump.

Figure 2:
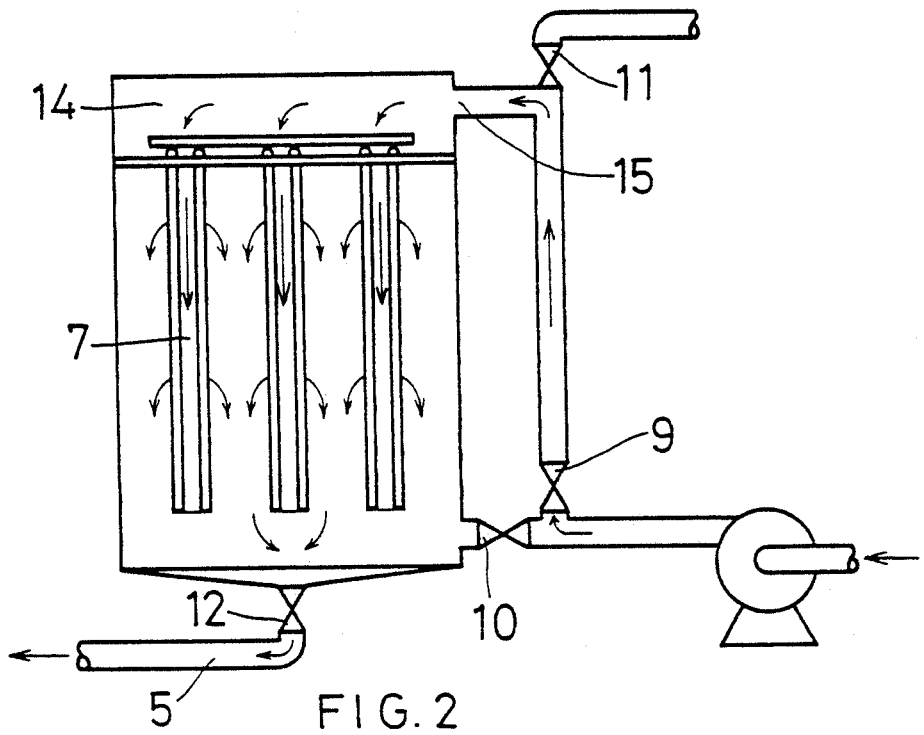
FIG. 2 illustrates the pressure filter in a backwash stage.

Referring now to FIG. 2, the caked filtered matter may be removed from the filter medium by closing the inlet valve 10 and the outlet valve 11 while opening the connecting valve 9 and the drain valve 12. The pumped fluid then flows in to the filter through the outlet 15, into the manifold 14, and into the leaf cones 7 and through the filter medium. The fluid passing through the filter medium moves the cakes and filter aid from the filter medium external surface and transports it from the pressure vessel via the drain pipe 5 thereby effecting a backwashing of the filter.

It will readily be appreciated that the filtration aid is lost from the pressure vessel along with the filtered matter.

Such a conventional filtration cycle is modified by the present invention as follows: Once the flow rate of fluid to be filtered reaches an unacceptably low level or, alternatively, at pre-set periodic intervals, the inlet valve 10 and the outlet valve 11 are closed while the connecting valve 9 is opened. This causes a reversed flow of fluid through the filter. The drain valve 12 is also opened for a short period of time, generally in the region of 2 seconds. The drain valve 12 is then closed and after a period of time, generally in the region of 10 seconds, the inlet valve 10 and the outlet valve 11 are opened once more while the connecting valve 9 is closed. The filter thus returns to the normal filtration stage.

This regeneration procedure or reversed pulse flow loosens the filter cake and filter aid without any appreciable loss of filtration aid, if any, but enables the filter aid and filter cake to become mixed to some extent thereby enabling liquid to pass through the mixture more easily than it would through the previously present filter cake on the outside of the filter aid.

It will be appreciated that the majority of the filter cake and filter aid will remain within the pressure vessel although it will become temporarily suspended in the fluid contained therein. The suspended matter will clearly form another layer once the filtration process is resumed. The pump may be switched off prior to each valve setting change and then re-activated if appropriate.

Conveniently there is provided a controller to effect automatic regeneration of the filter in this manner. Essentially the controller will include an input from a timing means and will provide electrical output signals, to each one of the pump, the inlet valve 10, the outlet valve 11, the drain valve 12 and the connecting valve 9. The valves conveniently comprise butterfly valves which are driven by electrical motors or solenoids. The actuation signal received from the controller will cause the particular motor or solenoid to either open or close the driven valve. The input received from the timing means may be in the form of a mechanical or an electrical pulse. The controller may comprise any suitable programable controller of the types known in the art and may be analog, for example a standard swimming pool controller, or digital. The controller may be programmed such that the output, on receiving a particular input, effects the necessary actuation of the valves and pump.

The timing means may comprise any suitable analog or digital timer which may be synchronised to real time and its operation independant f the rest of the system. Further, two timers may be provided, one to indicate whether the filter should be in filter, regeneration, backwash or shutdown mode and the other, which is activated by the first to time the controller within the regenerative or pulsed reverse flow mode. The level of sophistication of the controller and timing means may be selected to provide for particular applicants, and may comprise standard swimming pool timers.

Figure 3:
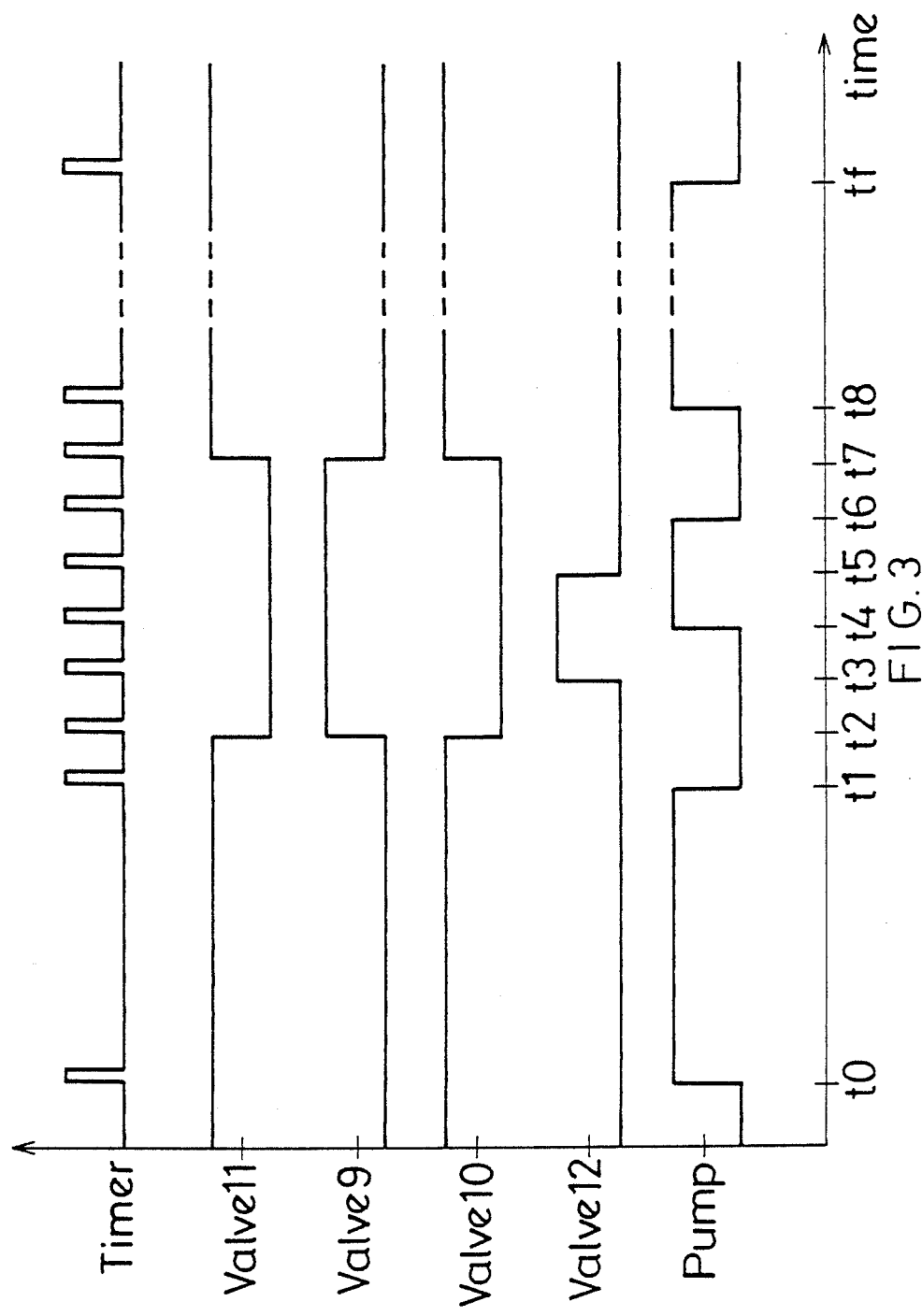
FIG. 3 illustrates a process control chart depicting the method of operation according to the invention.

Referring now to FIG. 3, there is provided a typical control diagram for a filtration cycle. The x-axis schematically indicates time while the y-axis indicates the state of the timer, valves and pump. It will be appreciated that when a valve has a reading above the individual mean, then it is open while a reading below the mean indicates the valve is closed. Similarly a reading above the individual mean for the pump indicates the pump is operational. The timer activity is indicated by pulses.

At time before $t_o$, the inlet valve 10 and the outlet valve 11 are open while the drain valve 12 and the connecting valve 9 are closed. The pump is not operational. The filter is in shutdown mode. At a time $t_o$, the timer pulses the controller which activates the pump. The filter is in filtration mode and fluid entering the filter is filtered. At a pre-set time $t_1$, the timer pulses the controller to initiate the reversed pulse regenerative mode by de-activating the pump. This step is not necessary but is preferred. Almost immediately thereafter, at time $t_2$, the timer pulses the controller to close the inlet and outlet valves 10 and 11 and to open the connecting valve 9.

Almost immediately thereafter at time $t_3$, the timer pulses the controller to open the drain valve 12. At time $t_4$, the timer pulses the controller to activate the pump. At time $t_5$, approximately 2 seconds after time $t_4$, the controller is pulsed by the timer to effect closing of the drain valve 12. Approximately 10 seconds thereafter, at time $t_6$, the pump is de-activated. Immediately after, at time $t_7$, the inlet and outlet valves 10 and 11 are opened while the connecting valve 9 is closed. Immediately thereafter, at time $t_8$, the pump is again activated. The regeneration mode is complete at this time. The filter may then enter successive filtration and regeneration modes until time $t_f$, when the filter is backwashed in the usual way.

The controller may be provided with a manual override. The manual override may include manual on/off switches for the valves and the pump. The manual override will enable the operator thereto to operate the filter in any particular mode, including a backwash mode.

For convenience, a pilot light may be associated with each output signal from the controller viz. to the pump and each of the valves 9, 10, 11, and 12. The pilot light will indicate whether the pump, or any one of the valves has been activated.

It will be appreciated that the invention provides a method of filtration which reduces backwash or downtime and loss of filtration aid as well as a convenient means for effecting control of the filtration method. It will also substantially lengthen the servicability of each batch of filtration aid by the simple expendient of causing the filter aid and filtered material to rearrange itself on the filter medium during each reverse pulsed regeneration phase. The costs of filtration aid, which are substantial, may thus be significantly reduced.

What I claim as new and desire to secure by Letters Patent is:

1. In a method of batch filtration wherein liquid is passed through a layer of filter aid supported on a substrata therefor in a filter including a pressure vessel, and a filter cake is built up on the filter aid and wherein cleaning of the filter is carried out periodically by backwashing the filter cake and filter aid out of the filter followed by the introduction of clean filter aid into the filter, the filter having inlet and outlet means, wherein the improvement comprises a filtration cycle between successive backwashings which include a reversed pulse of liquid flow into a liquid flow outlet from the filter with all liquid inlets to the filter being closed and a drain from the filter being temporarily opened; to effect a temporary loosening and breaking up of both the layer of filter aid and the filter cake to cause the filter aid and filter cake to become at least partially admixed thereby enabling liquid to pass through the mixture more easily than before said reversed pulse, wherein filtration is carried out both before and after such reversed pulse of liquid flow, wherein the substrata for the filter aid is a flexible bag or sleeve supported on a frame therefor and the bag or sleeve is caused to billow outwardly during the reversed pulse of fluid flow to thereby assist in breaking up the filter cake and layer of filter aid and wherein the duration of the reversed pulse is about 10 seconds and the duration of the time the drain from the filter is temporarily opened is about 2 seconds such that the majority of the filter cake and filter aid remain temporarily suspended in the fluid within the pressure vessel during the reversed pulse.

2. A method as claimed in claim 1 in which the filter aid is diatomaceous earth.

3. A method as claimed in claim 2 in which the initial thickness of the layer of diatomaceous earth is about 0.2 to about 0.3 inches.

* * * * *